United States Patent
Shen et al.

(10) Patent No.: US 12,446,015 B2
(45) Date of Patent: Oct. 14, 2025

(54) METHOD AND APPARATUS FOR SIDELINK INFORMATION TRANSMISSION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Jia Shen, Dongguan (CN); Zhenshan Zhao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 559 days.

(21) Appl. No.: 17/195,474

(22) Filed: Mar. 8, 2021

(65) Prior Publication Data

US 2021/0195593 A1 Jun. 24, 2021

Related U.S. Application Data

(63) Continuation of application No. PCT/CN2019/105800, filed on Sep. 12, 2019.

(60) Provisional application No. 62/730,778, filed on Sep. 13, 2018.

(51) Int. Cl.
*H04W 72/0453* (2023.01)
*H04L 5/14* (2006.01)

(52) U.S. Cl.
CPC ........... *H04W 72/0453* (2013.01); *H04L 5/14* (2013.01)

(58) Field of Classification Search
CPC .................. H04W 72/0453; H04L 5/14
See application file for complete search history.

(56) References Cited

U.S. PATENT DOCUMENTS

| | | | |
|---|---|---|---|
| 2018/0183551 A1 | 6/2018 | Chou et al. | |
| 2019/0029029 A1* | 1/2019 | Ohtsuji | H04W 4/023 |
| 2019/0044811 A1* | 2/2019 | Miao | H04L 5/001 |
| 2019/0165982 A1* | 5/2019 | Gaal | H04L 27/26025 |
| 2021/0329598 A1* | 10/2021 | Wang | H04W 4/40 |
| 2021/0352623 A1* | 11/2021 | Wang | H04W 72/0453 |

FOREIGN PATENT DOCUMENTS

| | | |
|---|---|---|
| CN | 107396386 A | 11/2017 |
| EP | 3808023 A1 | 4/2021 |

(Continued)

OTHER PUBLICATIONS

Guangdong OPPO Mobile Telecommunications Corp., International Search Report and Written Opinion, PCT/CN2019/105800, Nov. 28, 2019, 7 pgs.

(Continued)

*Primary Examiner* — Wayne H Cai
(74) *Attorney, Agent, or Firm* — Morgan, Lewis & Bockius LLP

(57) ABSTRACT

A method and apparatus for sidelink information transmission, and a terminal device and a network device. In the method, a first UE (user equipment) receives first configuration information from a base station, wherein the first configuration information is to configure the first UE with at least one first bandwidth part (BWP) for sidelink reception; and the UE receives sidelink information from a second UE on the first BWP.

8 Claims, 6 Drawing Sheets

(56) References Cited

FOREIGN PATENT DOCUMENTS

WO  WO2018/106043 A1  6/2018
WO  WO2020/052670 A1  3/2020

OTHER PUBLICATIONS

Huawei, "Sidelink physical layer structure and procedure for NR V2X," 3GPP TSG RAN WG1 Meeting #94, R1-1808093, Gothenburg, Sweden, Aug. 20-24, 2018, 6 pgs.
ZTE, "Discussion on LTE/NR Uu based resource allocation/configuration for NR sidelink," 3GPP TSG RAN WG1 Meeting #94, R1-1808606, Gothenburg, Sweden, Aug. 20-24, 2018, 3 pgs.
Guangdong OPPO Mobile Telecommunications Corp., Ltd., Extended European Search Report, EP19860669.1, Oct. 26, 2021, 11 pgs.
Intel Corporation, "Sidelink Synchronization for NR V2X Communication," 3GPP TSG RAN WG1 Meeting #94, R1-1808695, Gothenburg, Sweden, Aug. 20-24, 2018, 11 pgs.
Guangdong OPPO Mobile Telecommunications Corp., Ltd., EP19860669.1, First Office Action, Sep. 11, 2023, 7 pgs.

\* cited by examiner

METHOD AND APPARATUS FOR SIDELINK INFORMATION TRANSMISSION, TERMINAL DEVICE, AND NETWORK DEVICE

CROSS-REFERENCE TO RELATED APPLICATIONS

The present application is a continuation of International Application No. PCT/CN2019/105800, filed on Sep. 12, 2019, which claims the benefit of U.S. Provisional Application No. 62/730,778, filed on Sep. 13, 2018, all of which are hereby incorporated by reference in their entirety.

TECHNICAL FIELD

The disclosure relates to the field of mobile communications, and particularly, to a method and apparatus for sidelink information transmission, a terminal device and a network device.

BACKGROUND

In legacy design in long evolution (LTE) device to device (D2D) and vehicle to x (V2X) specifications, a sidelink resource for a transmit user equipment (UE) can be scheduled by a base station (BS), e.g. a DCI format (DCI Format 5) is used to schedule the sidelink for Physical Sidelink Control Channel (PSCCH) and Physical Sidelink Share Channel (PSSCH) to the UE. The UE would inform the scheduling information for PSSCH to a receive UE, and then transmit its sidelink data/signaling in PSSCH and PSCCH to the receive UE based on the scheduling information.

SUMMARY

Embodiments of the disclosure provide a method and apparatus for sidelink information transmission, a terminal device, a network device, a chip, a computer readable storage medium, a computer program product, and a computer program.

At a first aspect, a method for sidelink information transmission is provided. The method includes the following actions. A first UE receives first configuration information from a base station, the first configuration information is to configure the first UE with at least one first bandwidth part (BWP) for sidelink reception. The UE receives sidelink information from a second UE on the first BWP.

In combination with the first aspect, in some implementations of the first aspect, the first BWP is configured with at least one of a numerology, a bandwidth, or a frequency domain position.

In combination with the first aspect, in some implementations of the first aspect, the first BWP is configured on a sidelink carrier different from a downlink (DL) carrier and an uplink (UL) carrier.

In combination with the first aspect, in some implementations of the first aspect, the method further includes that, the first UE receives signaling indicating an index of the first BWP, the first BWP is activated with the signaling.

In combination with the first aspect, in some implementations of the first aspect, the bandwidth and the frequency domain position of the first BWP are indicated based on a common PRB grid. The common PRB grid may be defined based on a frequency domain position of the sidelink carrier or a frequency domain position of a sidelink synchronization signal.

In combination with the first aspect, in some implementations of the first aspect, the first BWP is configured on a UL carrier, and the first BWP is associated with an UL BWP on the UL carrier.

In combination with the first aspect, in some implementations of the first aspect, the method further includes that, the first UE receives signaling indicating an index of the first BWP or an index of the UL BWP, and both the first BWP and the UL BWP are activated with the signaling.

In combination with the first aspect, in some implementations of the first aspect, the bandwidth and the frequency domain position of the first BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH block in a DL carrier.

In combination with the first aspect, in some implementations of the first aspect, the first BWP is configured on a time division duplex (TDD) carrier, and the first BWP is associated with an UL BWP on the TDD carrier and a DL BWP on the TDD carrier.

In combination with the first aspect, in some implementations of the first aspect, the method further includes that, the first UE receives signaling indicating an index of the TDD carrier, or a sidelink synchronization signal or a synchronization signal/physical broadcast channel (SS/PBCH) block in DL carrier, and all of the first BWP, the UL BWP and the DL BWP are activated with the signaling.

In combination with the first aspect, in some implementations of the first aspect, the method further includes that, the first UE receives second configuration information from the base station, the second configuration information is to configure the first UE with at least one second bandwidth part (BWP) for sidelink transmission; and the first UE transmits sidelink information to a third UE on the second BWP.

In combination with the first aspect, in some implementations of the first aspect, the second BWP is configured with a numerology, a bandwidth, and a frequency domain position.

In combination with the first aspect, in some implementations of the first aspect, the second BWP is configured on a sidelink carrier different from a downlink (DL) carrier and an uplink (UL) carrier.

In combination with the first aspect, in some implementations of the first aspect, the method further includes that, the first UE receives signaling indicating an index of the second BWP, and the second BWP is activated with the signaling.

In combination with the first aspect, in some implementations of the first aspect, the bandwidth and the frequency domain position of the second BWP are indicated based on a common PRB grid. The common PRB grid may be defined based on a frequency domain position of the sidelink carrier or a frequency domain position of a sidelink synchronization signal.

In combination with the first aspect, in some implementations of the first aspect, the second BWP is configured on a UL carrier, and the second BWP is associated with an UL BWP on the UL carrier.

In combination with the first aspect, in some implementations of the first aspect, the method further includes that, the first UE receives signaling indicating an index of the second BWP or the UL BWP, and both the second BWP and the UL BWP are activated with the signaling.

In combination with the first aspect, in some implementations of the first aspect, the bandwidth and the frequency domain position of the second BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH (synchronization signal/physical broadcast channel) block in a DL carrier.

In combination with the first aspect, in some implementations of the first aspect, the second BWP is configured on a time division duplex (TDD) carrier, and the second BWP is associated with an UL BWP on the TDD carrier and a DL BWP on the TDD carrier.

In combination with the first aspect, in some implementations of the first aspect, the method further includes that, the first UE receives signaling indicating an index of the TDD carrier, a sidelink synchronization signal, or an SS/PBCH block in DL carrier, all of the second BWP, the UL BWP and the DL BWP are activated with the signaling.

At a second aspect, a method for sidelink information transmission is provided. The method includes the following actions. A base station transmits first configuration information to a first UE, the first configuration information is to configure the first UE with at least one first bandwidth part (BWP) for sidelink transmission. The base station transmits second configuration information to a second UE, the second configuration information is to configure the second UE with at the least one first BWP for sidelink reception.

In combination with the second aspect, in some implementations of the first aspect, the first BWP is configured with at least one of a numerology, a bandwidth, or a frequency domain position.

In combination with the second aspect, in some implementations of the first aspect, the first BWP is configured on a sidelink carrier different from a downlink (DL) carrier and an uplink (UL) carrier.

In combination with the second aspect, in some implementations of the first aspect, the method further includes that, the base station transmits signaling to the first UE, the signaling indicating an index of the first BWP, and the first BWP is activated with the signaling.

In combination with the second aspect, in some implementations of the first aspect, the bandwidth and the frequency domain position of the first BWP are indicated based on a common PRB grid. The common PRB grid may be defined based on a frequency domain position of the sidelink carrier or a frequency domain position of a sidelink synchronization signal.

In combination with the second aspect, in some implementations of the first aspect, the first BWP is configured on a UL carrier, and the first BWP is associated with an UL BWP on the UL carrier.

In combination with the second aspect, in some implementations of the first aspect, the method further includes that, the base station transmits signaling to the first UE, the signaling indicating an index of the first BWP or an index of the UL BWP, and both the first BWP and the UL BWP are activated with the signaling.

In combination with the second aspect, in some implementations of the first aspect, the bandwidth and the frequency domain position of the first BWP is indicated based on a common PRB grid. The common PRB grid may be defined based on a reference point relative to the frequency domain position of the UL carrier, or fa frequency domain position of a sidelink synchronization signal, or a frequency domain position of an SS/PBCH block in a DL carrier.

In combination with the second aspect, in some implementations of the first aspect, the first BWP is configured on a time division duplex (TDD) carrier, and the first BWP is associated with an UL BWP on the TDD carrier and a DL BWP on the TDD carrier.

In combination with the second aspect, in some implementations of the first aspect, the method further includes that, the base station transmits signaling to the first UE, the signaling indicating an index of the TDD carrier, or a sidelink synchronization signal or a synchronization signal/physical broadcast channel (SS/PBCH) block in DL carrier, and all of the first BWP, the UL BWP and the DL BWP are activated with the signaling.

In combination with the second aspect, in some implementations of the first aspect, the second BWP is configured with a numerology, a bandwidth, and a frequency domain position.

In combination with the second aspect, in some implementations of the first aspect, the second BWP is configured on a sidelink carrier different from a downlink (DL) carrier and an uplink (UL) carrier.

In combination with the second aspect, in some implementations of the first aspect, the method further includes that, the base station transmits signaling to the second UE, the signaling indicating an index of the second BWP, and the second BWP is activated with the signaling.

In combination with the second aspect, in some implementations of the first aspect, the bandwidth and the frequency domain position of the second BWP are indicated based on a common PRB grid. The common PRB grid may be defined based on a frequency domain position of the sidelink carrier or a frequency domain position of a sidelink synchronization signal.

In combination with the second aspect, in some implementations of the first aspect, the second BWP is configured on a UL carrier, and the second BWP is associated with an UL BWP on the UL carrier.

In combination with the second aspect, in some implementations of the first aspect, the method further includes that, the base station transmits signaling to the second UE, the signaling indicating an index of the second BWP or the UL BWP, and both the second BWP and the UL BWP are activated with the signaling.

In combination with the second aspect, in some implementations of the first aspect, the bandwidth and the frequency domain position of the second BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH (synchronization signal/physical broadcast channel) block in a DL carrier.

In combination with the second aspect, in some implementations of the first aspect, the second BWP is configured on a time division duplex (TDD) carrier, and the second BWP is associated with an UL BWP on the TDD carrier and a DL BWP on the TDD carrier.

In combination with the second aspect, in some implementations of the first aspect, the method further includes that, the base station transmits signaling to the second UE, the signaling indicating an index of the TDD carrier, a sidelink synchronization signal, or an SS/PBCH block in DL carrier, all of the second BWP, the UL BWP and the DL BWP are activated with the signaling.

At a third aspect, an apparatus for sidelink information transmission is provided. The apparatus includes a first receiving unit and a second receiving unit. The first receiving unit is configured to receive first configuration information from a base station, the first configuration information is to configure the first UE with at least one first bandwidth part (BWP) for sidelink reception. The second receiving unit is configured to receive sidelink information from a second UE on the first BWP.

In combination with the third aspect, in some implementations of the third aspect, the first BWP is configured with at least one of a numerology, a bandwidth, or a frequency domain position.

In combination with the third aspect, in some implementations of the third aspect, the first BWP is configured on a sidelink carrier different from a downlink (DL) carrier and an uplink (UL) carrier.

In combination with the third aspect, in some implementations of the third aspect, the apparatus further includes a third receiving unit, configured to receive signaling indicating an index of the first BWP, and the first BWP is activated with the signaling.

In combination with the third aspect, in some implementations of the third aspect, the bandwidth and the frequency domain position of the first BWP are indicated based on a common PRB grid. The common PRB grid may be defined based on a frequency domain position of the sidelink carrier or a frequency domain position of a sidelink synchronization signal.

In combination with the third aspect, in some implementations of the third aspect, the first BWP is configured on a UL carrier, and the first BWP is associated with an UL BWP on the UL carrier.

In combination with the third aspect, in some implementations of the third aspect, the apparatus further includes a fourth receiving unit, configured to receive signaling indicating an index of the first BWP or an index of the UL BWP, and both the first BWP and the UL BWP are activated with the signaling.

In combination with the third aspect, in some implementations of the third aspect, the bandwidth and the frequency domain position of the first BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH block in a DL carrier.

In combination with the third aspect, in some implementations of the third aspect, the first BWP is configured on a time division duplex (TDD) carrier, and the first BWP is associated with an UL BWP on the TDD carrier and a DL BWP on the TDD carrier.

In combination with the third aspect, in some implementations of the third aspect, the apparatus further includes a fifth receiving unit, configured to receive signaling indicating an index of the TDD carrier, or a sidelink synchronization signal or a synchronization signal/physical broadcast channel (SS/PBCH) block in DL carrier, all of the first BWP, the UL BWP and the DL BWP are activated with the signaling.

In combination with the third aspect, in some implementations of the third aspect, the apparatus further includes a sixth receiving unit and a first transmitting unit, the sixth receiving unit is configured to receive second configuration information from a base station, the second configuration information is to configure the first UE with at least one second bandwidth part (BWP) for sidelink transmission; and the first transmitting unit is configured to transmit sidelink information to a third UE on the second BWP.

In combination with the third aspect, in some implementations of the third aspect, the second BWP is configured with a numerology, a bandwidth, and a frequency domain position.

In combination with the third aspect, in some implementations of the third aspect, the second BWP is configured on a sidelink carrier different from a downlink (DL) carrier and an uplink (UL) carrier.

In combination with the third aspect, in some implementations of the third aspect, the apparatus further includes a seventh receiving unit, configured to receive signaling indicating an index of the second BWP, the second BWP is activated with the signaling.

In combination with the third aspect, in some implementations of the third aspect, the bandwidth and the frequency domain position of the second BWP are indicated based on a common PRB grid. The common PRB grid may be defined based on a frequency domain position of the sidelink carrier or a frequency domain position of a sidelink synchronization signal.

In combination with the third aspect, in some implementations of the third aspect, the second BWP is configured on a UL carrier, and the second BWP is associated with an UL BWP on the UL carrier.

In combination with the third aspect, in some implementations of the third aspect, the apparatus further includes an eighth receiving unit, configured to receive signaling indicating an index of the second BWP or the UL BWP, both the second BWP and the UL BWP are activated with the signaling.

In combination with the third aspect, in some implementations of the third aspect, the bandwidth and the frequency domain position of the second BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH (synchronization signal/physical broadcast channel) block in a DL carrier.

In combination with the third aspect, in some implementations of the third aspect, the second BWP is configured on a time division duplex (TDD) carrier, and the second BWP is associated with an UL BWP on the TDD carrier and a DL BWP on the TDD carrier.

In combination with the third aspect, in some implementations of the third aspect, the apparatus further includes a ninth receiving unit, configured to receive signaling indicating an index of the TDD carrier, a sidelink synchronization signal, or an SS/PBCH block in DL carrier, all of the second BWP, the UL BWP and the DL BWP are activated with the signaling.

At a fourth aspect, an apparatus for sidelink information transmission is provided. The apparatus includes a first transmitting unit and a second transmitting unit. the first transmitting unit is configured to transmit first configuration information to a first user equipment (UE), the first configuration information is to configure the first UE with at least one first bandwidth part (BWP) for sidelink transmission; the second transmitting unit is configured to transmit second configuration information to a second UE, the second configuration information is to configure the second UE with at the least one second BWP for sidelink reception.

In combination with the fourth aspect, in some implementations of the fourth aspect, the first BWP is configured with at least one of a numerology, a bandwidth, or a frequency domain position.

In combination with the fourth aspect, in some implementations of the fourth aspect, the first BWP is configured on a sidelink carrier different from a downlink (DL) carrier and an uplink (UL) carrier.

In combination with the fourth aspect, in some implementations of the fourth aspect, the apparatus further includes a third transmitting unit, configured to transmit signaling to the first UE, the signaling indicating an index of the first BWP, and the first BWP is activated with the signaling.

In combination with the fourth aspect, in some implementations of the fourth aspect, the bandwidth and the frequency domain position of the first BWP are indicated based on a common PRB grid. The common PRB grid may be defined based on a frequency domain position of the sidelink carrier or a frequency domain position of a sidelink synchronization signal.

In combination with the fourth aspect, in some implementations of the fourth aspect, the first BWP is configured on a UL carrier, and the first BWP is associated with an UL BWP on the UL carrier.

In combination with the fourth aspect, in some implementations of the fourth aspect, the apparatus further includes a fourth transmitting unit, configured to transmit signaling to the first UE, the signaling indicating an index of the first BWP or an index of the UL BWP, and both the first BWP and the UL BWP are activated with the signaling.

In combination with the fourth aspect, in some implementations of the fourth aspect, the bandwidth and the frequency domain position of the first BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH block in a DL carrier.

In combination with the fourth aspect, in some implementations of the fourth aspect, the first BWP is configured on a time division duplex (TDD) carrier, and the first BWP is associated with an UL BWP on the TDD carrier and a DL BWP on the TDD carrier.

In combination with the fourth aspect, in some implementations of the fourth aspect, the apparatus further includes a fifth transmitting unit, configured to transmit signaling to the first UE, the signaling indicating an index of the TDD carrier, or a sidelink synchronization signal or a synchronization signal/physical broadcast channel (SS/PBCH) block in DL carrier, and all of the first BWP, the UL BWP and the DL BWP are activated with the signaling.

In combination with the fourth aspect, in some implementations of the fourth aspect, the second BWP is configured with a numerology, a bandwidth, and a frequency domain position.

In combination with the fourth aspect, in some implementations of the fourth aspect, the second BWP is configured on a sidelink carrier different from a downlink (DL) carrier and an uplink (UL) carrier.

In combination with the fourth aspect, in some implementations of the fourth aspect, the apparatus further includes a sixth transmitting unit, configured to transmit signaling to the second UE, the signaling indicating an index of the second BWP, and the second BWP is activated with the signaling.

In combination with the fourth aspect, in some implementations of the fourth aspect, the bandwidth and frequency domain position of the second BWP are indicated based on a common PRB grid. The common PRB grid may be defined based on a frequency domain position of the sidelink carrier or a frequency domain position of a sidelink synchronization signal.

In combination with the fourth aspect, in some implementations of the fourth aspect, the second BWP is configured on a UL carrier, and the second BWP is associated with an UL BWP on the UL carrier.

In combination with the fourth aspect, in some implementations of the fourth aspect, the apparatus further includes a seventh transmitting unit, configured to transmit signaling to the second UE, the signaling indicating an index of the second BWP or the UL BWP, and both the second BWP and the UL BWP are activated with the signaling.

In combination with the fourth aspect, in some implementations of the fourth aspect, the bandwidth and the frequency domain position of the second BWP is indicated based on a common PRB grid. The common PRB grid may be defined based on a reference point relative to the frequency domain position of the UL carrier, or a frequency domain position of a sidelink synchronization signal, or a frequency domain position of an SS/PBCH (synchronization signal/physical broadcast channel) block in a DL carrier.

In combination with the fourth aspect, in some implementations of the fourth aspect, the second BWP is configured on a time division duplex (TDD) carrier, and the second BWP is associated with an UL BWP on the TDD carrier and a DL BWP on the TDD carrier.

In combination with the fourth aspect, in some implementations of the fourth aspect, the apparatus further includes configured to transmit signaling to the second UE, the signaling indicating an index of the TDD carrier, a sidelink synchronization signal, or an SS/PBCH block in DL carrier, all of the second BWP, the UL BWP and the DL BWP are activated with the signaling.

At a fifth aspect, a network device is provided. The network device includes a processor, a memory and a transceiver. The memory stores a computer program, which, when executed by the processor, causes the processor to implement the method described in the first aspect via the transceiver.

At a sixth aspect, a network device is provided. The network device includes a processor, a memory and a transceiver. The memory stores a computer program, which, when executed by the processor, causes the processor to implement or the method described in the second aspect via the transceiver.

At a seventh aspect, a chip is provided. The chip includes a processor. The processor is configured to call a computer program from a memory and run the computer program, to enable a device installing the chip to implement the method described in the first aspect or the method described in the second aspect.

At an eighth aspect, a computer readable storage medium is provided. The computer readable storage medium stores computer readable instructions, which, when executed by the processor, cause the processor to implement the method described in the first aspect or the method described in the second aspect.

At a ninth aspect, a computer program product is provided. The computer program product includes computer readable instructions, which, when executed by the processor, cause the processor to implement the method described in the first aspect or the method described in the second aspect.

At a tenth aspect, a computer program is provided. The computer program, which, when executed by a processor, cause the processor to implement the method described in the first aspect or the method described in the second aspect.

DETAILED DESCRIPTION

The following clearly and completely describes the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art based on the embodiments of the disclosure without creative efforts shall fall within the protection scope of the disclosure.

The embodiments of the disclosure described below can be applied to various communication systems, for example, the GSM (global system of mobile communication) system, the CDMA (code division multiple access) system, the WCDMA (wideband code division multiple access) system, the GPRS (general packet radio service), the LTE (long term evolution) system, LTE FDD (frequency division duplex) system, LTE TDD (time division duplex) system, the UMTS (universal mobile telecommunication system), the WiMAX (worldwide interoperability for microwave access), the 5G system, or the like.

Figure 1:
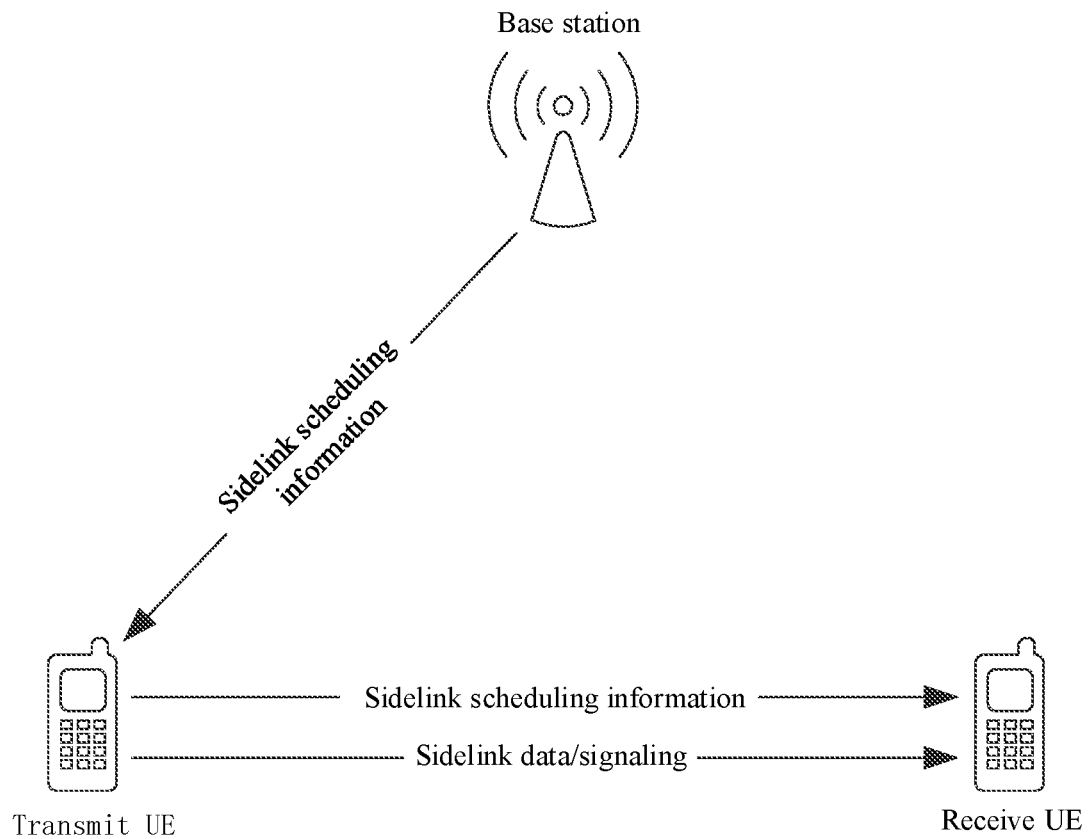
FIG. 1 illustrates a schematic view of an architecture of a communication system according to some embodiments of the disclosure.

FIG. 1 illustrates a schematic view of an architecture of a communication system according to some embodiments of the disclosure. Specifically, the communication system as illustrated in FIG. 1 includes a base station and two terminal devices including a transmit UE and a receive UE. The base station transmits sidelink scheduling information to the transmit UE, and the transmit UE informs the sidelink scheduling information to the receive UE, and then transmits sidelink data/signaling to the receive UE based on the sidelink scheduling information.

In the mechanism as illustrated in FIG. 1, The latency is large because the sidelink scheduling information is transmitted in 2 steps: From base station to transmit UE in the 1st step; from transmit UE to receive UE in the 2nd step. This substantially increases the transmission latency.

Additionally, in some deployment scenarios the channel condition between the two UEs is bad. The PSCCH is not reliable for forwarding the scheduling information.

Hence the disclosure cannot meet the latency and reliability requirements of 5G URLLC (Ultra-Reliable and Low-Latency Communications) services.

In view of the above, in an example of the disclosure, a method is proposed to reduce the latency of sidelink reception/transmission.

Figure 2:
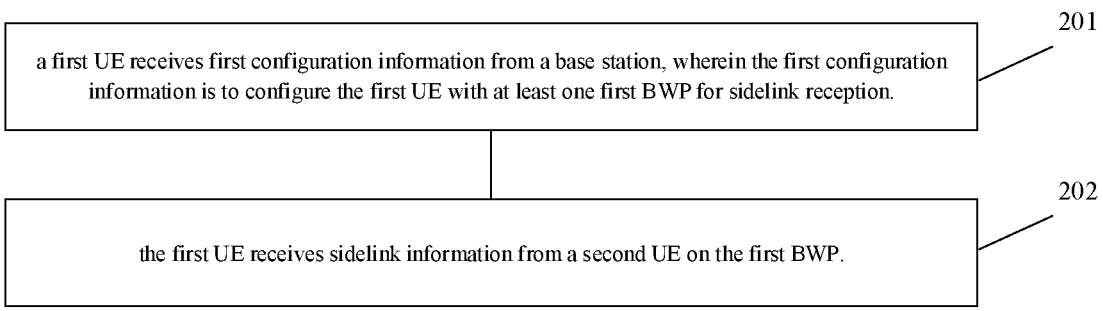
FIG. 2 illustrates a flow chart of a method for sidelink information transmission according to some embodiments of the disclosure.

FIG. 2 illustrates a flow chart of a method for sidelink information transmission according to some embodiments of the disclosure. The method for sidelink information transmission in these embodiments can be applied to a UE. The UE may be a mobile phone, a laptop, a notebook computer, a wearable device, an in-vehicle terminal, or any other device that can communicate with the network. As illustrated in FIG. 2, the method for sidelink information transmission may include the following actions illustrated in blocks. The method may begin at block 201.

At block 201, a first UE (user equipment) receives first configuration information from a base station, the first configuration information is to configure the first UE with at least one first bandwidth part (BWP) for sidelink reception.

In an example, the first configuration information may be carried in radio resource control (RRC) signaling. The RRC signaling may carry configuration information of one or more first BWPS for sidelink reception.

At block 202, the first UE receives sidelink information from a second UE on the first BWP.

Specifically, the first BWP may be configured with a numerology, a bandwidth, and a frequency domain position. The numerology may include subcarrier spacing and/or CP (cyclic prefix), and the bandwidth may include number of PRBs (Physical Resource Blocks), and the frequency domain position may include starting PRB or center frequency.

Figure 3:
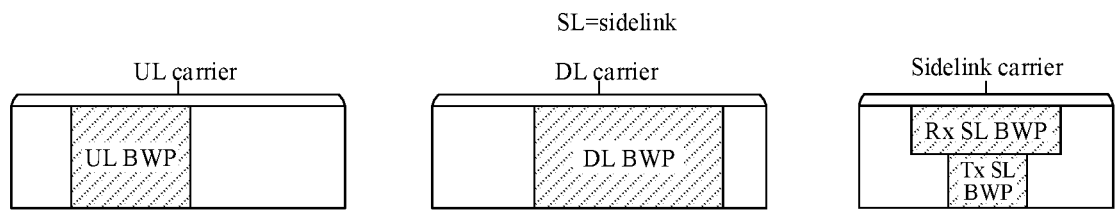
FIG. 3 illustrates a schematic view of a scenario of the BWP configuration of the disclosure.

Furthermore, the following describes scenarios of the first BWP configuration on different carriers:

Scenario 1. The first BWP is configured on a sidelink carrier different from a downlink (DL) carrier and an uplink (UL) carrier. As illustrated in FIG. 3, the first BWP may be configured independent from a DL BWP on the DL carrier and an UL BWP on the UL carrier. And the first BWP, DL BWP and UL BWP can be activated or deactivated separately.

In this embodiment, the UE may receive signaling indicating an index of the first BWP, and the first BWP may be activated with the signaling. The signaling may be, but is not limited to a DCI or an RRC signaling.

The signaling for activating the first BWP may be as same as or different from the signaling carrying the first configuration information.

In an example, as described above, the first configuration information may be carried in an RRC signaling. In the case that the RRC signaling carries configuration information of merely one first BWP, this BWP may be activated with the RRC signaling per se. In other words, the signaling carrying the first configuration information and signaling for activating the first BWP are the same, i.e., the RRC signaling. In the case that the RRC signaling carries configuration information of more than one first BWP, a first BWP for a specific UE may be activated by a downlink control information (DCI) signaling. In other words, the index of the first BWP is indicated in the DCI, and thus the signaling indicating the index of the first BWP to activate the first BWP is different from the signaling carrying the first configuration information.

In addition, the bandwidth and the frequency domain position of the first BWP may be indicated based on a common PRB grid. The common PRB grid may be defined based on a frequency domain position of the sidelink carrier or a frequency domain position of a sidelink synchronization signal.

The common PRB grid may include multiple PRBs, e.g., PRB #0-PRB #500. In an example, the common PRB grid may be located with the frequency domain position of PRB #0. When the frequency domain offset of the PRB #0 relative to the frequency domain position of the sidelink carrier or the frequency domain position of the sidelink synchronization signal is determined, the common PRB grid can be located. Then, the bandwidth and the frequency domain position of the first BWP may be indicated with a range of PRBs in the common PRB grid, e.g., 101-200.

Figure 4:
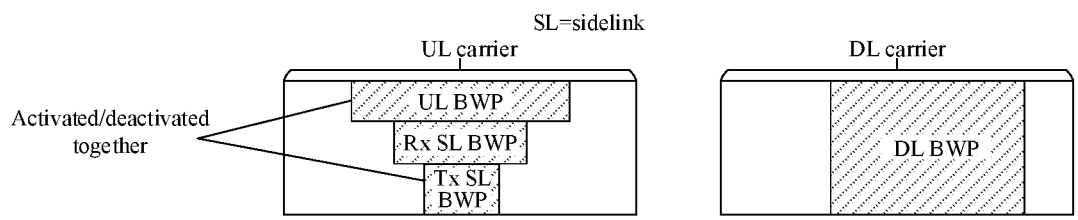
FIG. 4 illustrates a schematic view of a scenario of the BWP configuration of the disclosure.

Scenario 2. The first BWP is configured on a UL carrier, i.e. sidelink and UL share the same carrier. As illustrated in FIG. 4, the first BWP is associated with an UL BWP on the UL carrier. Here, the term "associated with" may imply that the first BWP and UL BWP will be activated or deactivated together.

In an example, the first BWP may be associated with an UL BWP on the UL carrier in their configurations. For example, it may be predetermined that the first BWP and the UL BWP have a same center frequency, and/or the first BWP is a part of the UL BWP (e.g., half of the UL BWP). In this case, the configuration information of the first BWP can be derived from the configuration information of the UL BWP, thereby simplifying the configuration of the first BWP.

In this embodiment, the UE may receive signaling indicating an index of the first BWP or an index of the UL BWP, and both the first BWP and the UL BWP may be activated with the signaling. The signaling may be, but is not limited to a DCI or an RRC signaling.

In addition, the bandwidth and the frequency domain position of the first BWP may be indicated based on a common PRB grid, and the common PRB grid may be defined based on a frequency domain position of the sidelink carrier or a frequency domain position of a sidelink synchronization signal.

Figure 5:
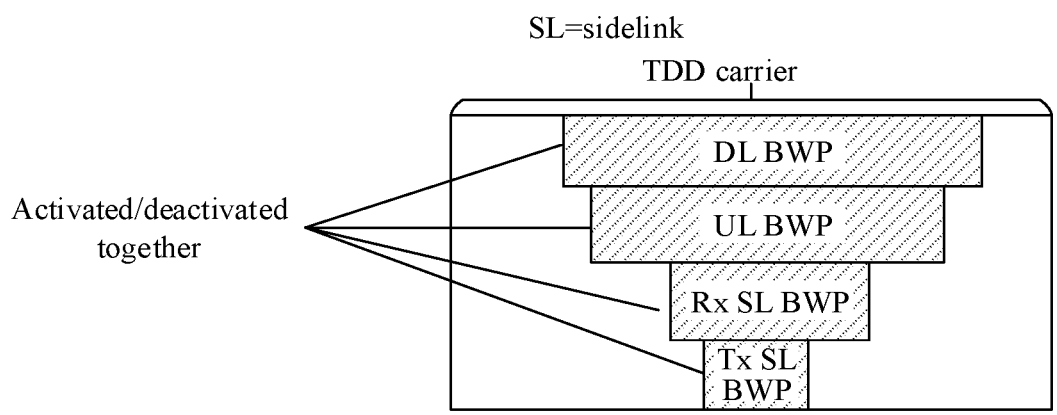
FIG. 5 illustrates a schematic view of a scenario of the BWP configuration of the disclosure.

Scenario 3. The first BWP is configured on a time division duplex (TDD) carrier, i.e. sidelink, DL and UL share the same carrier. As illustrated in FIG. 5, the first BWP is associated with an UL BWP on the TDD carrier and a DL BWP on the TDD carrier. Similar as the above, the term "associated with" may imply that the first BWP, the UL BWP and the DL BWP will be activated or deactivated together.

In an example, the first BWP may be associated with the UL BWP on the TDD carrier and the DL BWP on the TDD carrier in their configurations. For example, it may be predetermined that the first BWP has a same center frequency as that of the UL BWP and/or the DL BWP, and/or the first BWP is a part of the UL BWP and/or the DL BWP (e.g., half of the UL BWP and/or the DL BWP). In this case, the configuration information of the first BWP can be derived from the configuration information of the UL BWP and/or DL BWP, thereby simplifying the configuration of the first BWP.

In this embodiment, the UE may receive signaling indicating an index of the TDD carrier, or a sidelink synchronization signal or a synchronization signal/physical broadcast channel (SS/PBCH) block in DL carrier, and all of the first BWP, the UL BWP and the DL BWP are activated with the signaling. The signaling may be, but is not limited to a DCI or an RRC signaling.

In addition, the bandwidth and the frequency domain position of the second BWP may be indicated based on a common PRB grid, and the common PRB grid may be defined based on a frequency domain position of the sidelink carrier or a frequency domain position of a sidelink synchronization signal or frequency domain positions of SS/PBCH block in DL carrier.

In an embodiment, the first UE receives second configuration information from the base station, the second configuration information is to configure the first UE with at least one second bandwidth part (BWP) for sidelink transmission, and the first UE transmits sidelink information to a third UE on the second BWP.

In this embodiment, the second BWP may be configured with a numerology, a bandwidth, and a frequency domain position. The numerology may include subcarrier spacing and/or CP (cyclic prefix), and the bandwidth may include number of PRBs (Physical Resource Blocks), and the frequency domain position may include starting PRB or center frequency.

Furthermore, the following describes scenarios of the second BWP configuration on different carriers:

Scenario 1. The second BWP is configured on a sidelink carrier different from a downlink (DL) carrier and an uplink (UL) carrier. As illustrated in FIG. 3, the second BWP may be configured independent from a DL BWP on the DL carrier and an UL BWP on the UL carrier. And the second BWP, DL BWP and UL BWP can be activated or deactivated separately.

In this embodiment, the UE may receive signaling indicating an index of the second BWP, and the second BWP may be activated with the signaling. The signaling may be, but is not limited to a DCI or an RRC signaling.

In addition, the bandwidth and the frequency domain position of the second BWP may be indicated based on a common PRB grid. The common PRB grid may be defined based on a frequency domain position of the sidelink carrier or a frequency domain position of a sidelink synchronization signal.

Alternatively, a timer can be configured for the second BWP. When the timer expires, the second BWP is deactivated and another receive sidelink BWP becomes active, which can be named default receive sidelink BWP.

Scenario 2. The second BWP is configured on a UL carrier, i.e. sidelink and UL share the same carrier. As illustrated in FIG. 4, the first BWP is associated with an UL BWP on the UL carrier. And the second BWP and UL BWP will be activated or deactivated together.

In this embodiment, the UE may receive signaling indicating an index of the first BWP or an index of the UL BWP, and both the first BWP and the UL BWP may be activated with the signaling. The signaling may be, but is not limited to a DCI or an RRC signaling.

In addition, the bandwidth and the frequency domain position of the second BWP may be indicated based on a common PRB grid. The common PRB grid may be defined based on a frequency domain position of the sidelink carrier or a frequency domain position of a sidelink synchronization signal.

Scenario 3. The second BWP is configured on a time division duplex (TDD) carrier, i.e. sidelink, DL and UL share the same carrier. As illustrated in FIG. 5, the second BWP is associated with an UL BWP on the TDD carrier and a DL BWP on the TDD carrier. And the second BWP, the UL BWP and the DL BWP will be activated or deactivated together.

In this embodiment, the UE may receive signaling indicating an index of the TDD carrier, or a sidelink synchronization signal or a synchronization signal/physical broadcast channel (SS/PBCH) block in DL carrier, and all of the second BWP, the UL BWP and the DL BWP are activated with the signaling. The signaling may be, but is not limited to a DCI or an RRC signaling.

In addition, the bandwidth and the frequency domain position of the second BWP may be indicated based on a common PRB grid. The common PRB grid may be defined based on a frequency domain position of the sidelink carrier or a frequency domain position of a sidelink synchronization signal or frequency domain positions of SS/PBCH block in DL carrier.

Furthermore, the sidelink BWP switching could be common for both transmission and reception, i.e. when a first BWP (transmit sidelink BWP) is activated/deactivated, the second BWP (associated receive sidelink BWP) could be also activated/deactivated.

In addition, when a transmit sidelink BWP (a first BWP) is active for a UE, the UE could transmit the sidelink information in the BWP.

In addition, when a receive sidelink BWP (a second BWP) is active for a UE, the UE could receive the sidelink information in the BWP.

In addition, when a UE loses the DL or UL coverage, the active transmit sidelink BWP (a first BWP which is activated) could fall back to a specific transmit sidelink BWP, the active receive sidelink BWP (a second BWP which is activated) could fall back to a specific receive sidelink BWP. The specific transmit sidelink BWP and specific receive sidelink BWP could be configured or indicated by system information or derived from a pre-define principle.

An alternative is provided as follow: The transmit sidelink BWP (the first BWP) is not configured dedicatedly, And the active UL BWP is used for sidelink transmission. In this case, the UL BWP can be configured with more than one numerology such as combinations of subcarrier spacing and CP. Thus, UL BWP and transmit sidelink BWP could be associated with different numerologies.

According to the method for sidelink information transmission of the disclosure, upon reception of the first configuration information from a base station, the UE can receive the sidelink information within the first BWP. Thus, the frequency resource can be more efficiently allocated for sidelink, and power consumption can be reduced by configuring a relatively a receive sidelink BWP when a low data rate is needed. And since the receive sidelink BWP is directly configured by the base station, the BWP switching latency and scheduling latency are reduced compared to BWP configuration by the transmit UE.

Figure 6:
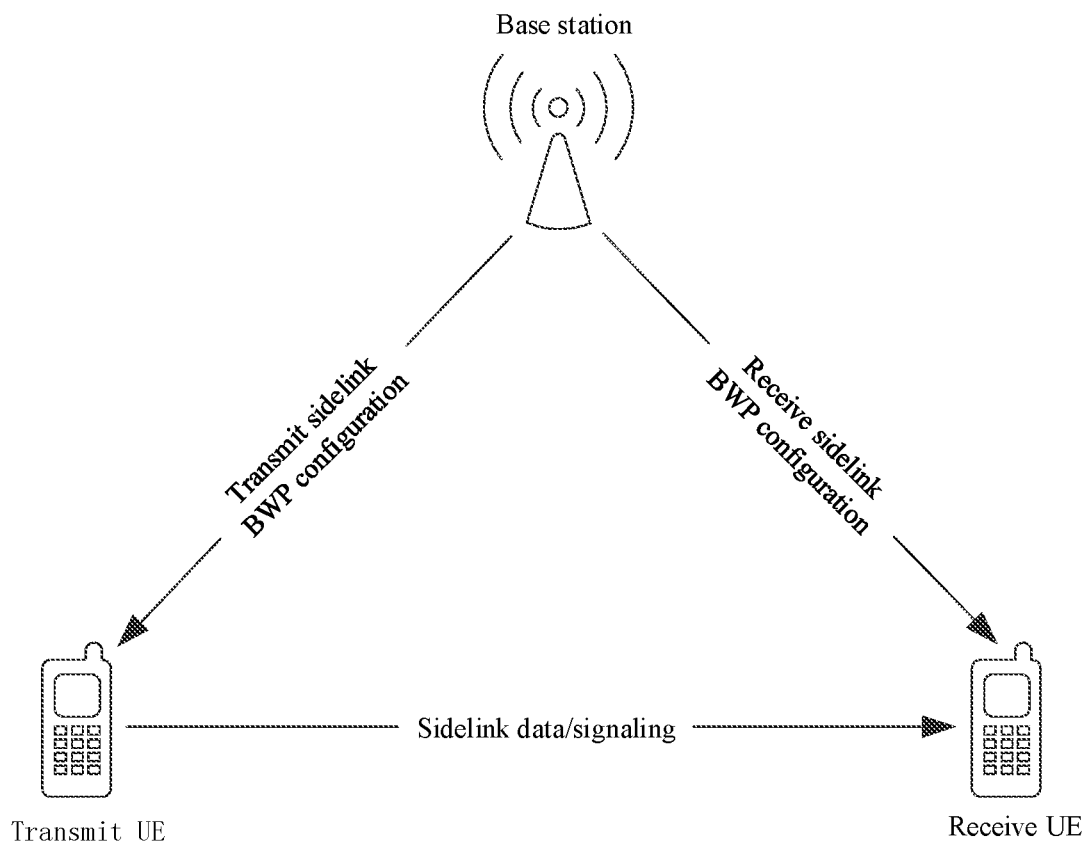
FIG. 6 illustrates a schematic view of an architecture of a communication system according to some embodiments of the disclosure.
Figure 7:
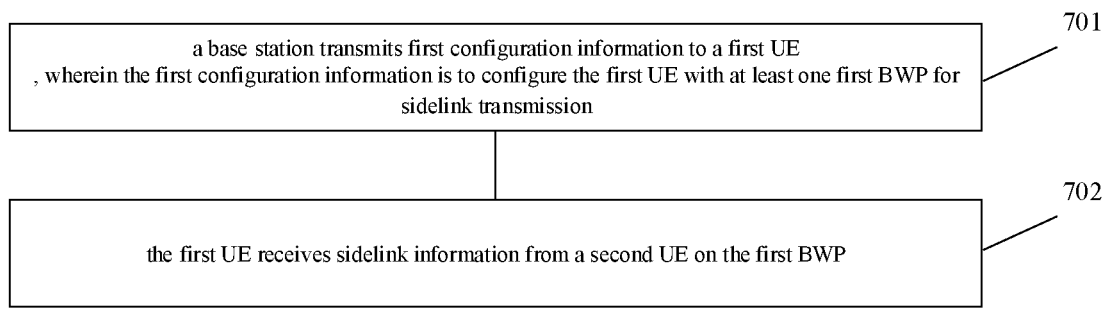
FIG. 7 illustrates a flow chart of a method for sidelink information transmission according to some embodiments of the disclosure.

FIG. 7 illustrates a flow chart of a method for sidelink information transmission according to some embodiments of the disclosure. And FIG. 6 illustrates a schematic view of an architecture of a communication system applied in these embodiments of the disclosure. The method for information transmission in these embodiments can be applied to a base station. The base station may be, but is not limited to a gNB in the 5G system. As illustrated in FIG. 7, the method for sidelink information transmission may include the following actions illustrated in blocks. The method may begin at block 701.

At block 701, a base station transmits first configuration information to a first UE (user equipment), the first configuration information is to configure the first UE with at least one first bandwidth part (BWP) for sidelink transmission.

At block 701, the base station transmits second configuration information to a second UE, the second configuration information is to configure the second UE with at the least one first BWP for sidelink reception.

In an embodiment, the first BWP is configured with a numerology, a bandwidth, and a frequency domain position.

In an embodiment, the first BWP is configured on a sidelink carrier different from a downlink (DL) carrier and an uplink (UL) carrier. The first BWP may be configured independent from a DL BWP on the DL carrier and an UL BWP on the UL carrier.

In an embodiment, the method further includes that, the base station transmits signaling to the first UE, the signaling indicating an index of the first BWP, and the first BWP is activated with the signaling.

In an embodiment, the bandwidth and the frequency domain position of the first BWP are indicated based on a common PRB grid. The common PRB grid is defined based on a frequency domain position of the sidelink carrier or a frequency domain position of a sidelink synchronization signal.

In an embodiment, the first BWP is configured on a UL carrier, and the first BWP is associated with an UL BWP on the UL carrier.

In an embodiment, the method further includes that, the base station transmits signaling to the first UE, the signaling indicating an index of the first BWP or an index of the UL BWP, and both the first BWP and the UL BWP are activated with the signaling.

In an embodiment, the bandwidth and the frequency domain position of the first BWP is indicated based on a common PRB grid. The common PRB grid is defined based on a reference point relative to the frequency domain position of the UL carrier, or a frequency domain position of a sidelink synchronization signal, or a frequency domain position of an SS/PBCH block in a DL carrier.

In an embodiment, the first BWP is configured on a time division duplex (TDD) carrier, and the first BWP is associated with an UL BWP on the TDD carrier and a DL BWP on the TDD carrier.

In an embodiment, the method further includes that, the base station transmits signaling to the first UE, the signaling indicating an index of the TDD carrier, or a sidelink synchronization signal or a synchronization signal/physical broadcast channel (SS/PBCH) block in DL carrier, and all of the first BWP, the UL BWP and the DL BWP are activated with the signaling.

In an embodiment, the second BWP is configured with a numerology, a bandwidth, and a frequency domain position.

In an embodiment, the second BWP is configured on a sidelink carrier different from a downlink (DL) carrier and an uplink (UL) carrier. The second BWP may be configured independent from a DL BWP on the DL carrier and an UL BWP on the UL carrier.

In an embodiment, the method further includes that, the base station transmits signaling to the second UE, the signaling indicating an index of the second BWP, and the second BWP is activated with the signaling.

In an embodiment, the bandwidth and the frequency domain position of the second BWP are indicated based on a common PRB grid. The common PRB grid is defined based on a frequency domain position of the sidelink carrier or a frequency domain position of a sidelink synchronization signal.

In an embodiment, the second BWP is configured on a UL carrier, and the second BWP is associated with an UL BWP on the UL carrier.

In an embodiment, the method further includes that, the base station transmits signaling to the second UE, the signaling indicating an index of the second BWP or the UL BWP, and both the second BWP and the UL BWP are activated with the signaling.

In an embodiment, the bandwidth and the frequency domain position of the second BWP is indicated based on a common PRB grid. The common PRB grid is defined based on a reference point relative to the frequency domain position of the UL carrier, or a frequency domain position of a sidelink synchronization signal, or a frequency domain position of a synchronization signal/physical broadcast channel (SS/PBCH) block in a DL carrier.

In an embodiment, the second BWP is configured on a time division duplex (TDD) carrier, and the second BWP is associated with an UL BWP on the TDD carrier and a DL BWP on the TDD carrier.

In an embodiment, the method further includes that, the base station transmits signaling to the second UE, the signaling indicating an index of the TDD carrier, a sidelink synchronization signal, or an SS/PBCH block in DL carrier, all of the second BWP, the UL BWP and the DL BWP are activated with the signaling.

Thus, the sidelink information can be transmitted within the first BWP or received within the second BWP besides transmitting/receiving in UL BWP and DL BWP. Consequently, the frequency resource can be more efficiently allocated for sidelink, and power consumption can be reduced by activating a relatively small transmit sidelink BWP (a first BWP) or receive sidelink BWP (a second BWP) when a low data rate is needed. In addition, since the receive sidelink BWP is directly configured/activated by a base station, the BWP switching latency and scheduling latency are reduced compared to BWP configuration/activation by the transmit UE.

Figure 8:
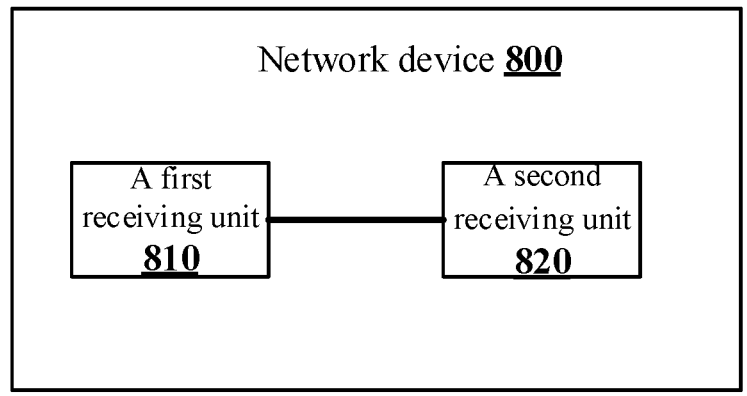
FIG. 8 illustrates a block diagram of an apparatus for sidelink information transmission according to some embodiments of the disclosure.

FIG. 8 illustrates a block diagram of an apparatus for sidelink information transmission according to some embodiments of the disclosure. As illustrated in FIG. 8, the sidelink information transmission apparatus includes a first receiving unit 810 and a second receiving unit 820.

For example, the first receiving unit can be implemented by a first transceiver, and the second receiving unit can be implemented by a second transceiver. For another example, the first receiving unit and the second receiving unit can be implemented by a same transceiver.

The first receiving unit 810 may be configured to receive first configuration information from a base station, the first configuration information is to configure the first UE with at least one first bandwidth part (BWP) for sidelink reception;

the second receiving unit 820 may be configured to receive sidelink information from a second UE on the first BWP.

In an embodiment, the first BWP may be configured with a numerology, a bandwidth, and a frequency domain position.

In an embodiment, the first BWP may be configured on a sidelink carrier different from a downlink (DL) carrier and an uplink (UL) carrier. The first BWP may be configured independent from a DL BWP on the DL carrier and an UL BWP on the UL carrier.

In an embodiment, the apparatus may further include a third receiving unit 830. The third receiving unit 830 may be configured to receive signaling indicating an index of the first BWP, the first BWP is activated with the signaling.

In an embodiment, the bandwidth and the frequency domain position of the first BWP may be indicated based on a common PRB grid. The common PRB grid is defined based on a frequency domain position of the sidelink carrier or a frequency domain position of a sidelink synchronization signal.

In an embodiment, the first BWP may be configured on a UL carrier, and the first BWP is associated with an UL BWP on the UL carrier.

In an embodiment, the apparatus may further include a fourth receiving unit 440.

The fourth receiving unit 840 may be configured to receive signaling indicating an index of the first BWP or an index of the UL BWP, both the first BWP and the UL BWP are activated with the signaling.

In an embodiment, the bandwidth and the frequency domain position of the first BWP may be indicated based on a common PRB grid. The common PRB grid is defined based on a reference point relative to the frequency domain position of the UL carrier, or a frequency domain position of a sidelink synchronization signal, or a frequency domain position of an SS/PBCH block in a DL carrier.

In an embodiment, the first BWP may be configured on a time division duplex (TDD) carrier, and the first BWP is associated with an UL BWP on the TDD carrier and a DL BWP on the TDD carrier.

In an embodiment, the apparatus may further include a fifth receiving unit 850. The fifth receiving unit 850 may be configured to receive signaling indicating an index of the TDD carrier, or a sidelink synchronization signal or a synchronization signal/physical broadcast channel (SS/PBCH) block in DL carrier, all of the first BWP, the UL BWP and the DL BWP are activated with the signaling.

In an embodiment, the apparatus may further include a sixth receiving unit 860 and a first transmitting unit 870.

The sixth receiving unit 860 may be configured to receive second configuration information from a base station, the second configuration information is to configure the first UE with at least one second bandwidth part (BWP) for sidelink transmission.

The first transmitting unit 870 may be configured to transmit sidelink information to a third UE on the second BWP.

In an embodiment, the second BWP may be configured with a numerology, a bandwidth, and a frequency domain position.

In an embodiment, the second BWP may be configured on a sidelink carrier different from a downlink (DL) carrier and an uplink (UL) carrier. The second BWP may be configured independent from a DL BWP on the DL carrier and an UL BWP on the UL carrier.

In an embodiment, the apparatus may further include a seventh receiving unit 880. The seventh receiving unit 880 may be configured to receive signaling indicating an index of the second BWP, the second BWP is activated with the signaling.

In an embodiment, the bandwidth and the frequency domain position of the second BWP may be indicated based on a common PRB grid. The common PRB grid is defined based on a frequency domain position of the sidelink carrier or a frequency domain position of a sidelink synchronization signal.

In an embodiment, the second BWP may be configured on a UL carrier, and the second BWP is associated with an UL BWP on the UL carrier.

In an embodiment, the apparatus may further include an eighth receiving unit 890. The eighth receiving unit 890 may be configured to receive signaling indicating an index of the second BWP or the UL BWP, both the second BWP and the UL BWP are activated with the signaling.

In an embodiment, the bandwidth and the frequency domain position of the second BWP may be indicated based on a common PRB grid. The common PRB grid is defined based on a reference point relative to the frequency domain position of the UL carrier, or a frequency domain position of a sidelink synchronization signal, or a frequency domain position of an SS/PBCH (synchronization signal/physical broadcast channel) block in a DL carrier.

In an embodiment, the second BWP may be configured on a time division duplex (TDD) carrier, and the second BWP is associated with an UL BWP on the TDD carrier and a DL BWP on the TDD carrier.

In an embodiment, the apparatus may further include a ninth receiving unit 891. The ninth receiving unit 891 may be configured to receive signaling indicating an index of the TDD carrier, a sidelink synchronization signal, or an SS/PBCH block in DL carrier, all of the second BWP, the UL BWP and the DL BWP are activated with the signaling.

Similar as described above, each of the third to ninth receiving units and the first transmitting unit may be implemented by a respective transceiver, or all or some of the first to ninth receiving units and the first transmitting unit may be implemented by a same transceiver.

As people of ordinary skill in the art can appreciate, the relevant description of the sidelink information transmission apparatus in the above embodiments of the disclosure may be understood in light of the relevant description of the sidelink information transmission method according to the embodiments of the disclosure.

Figure 9:
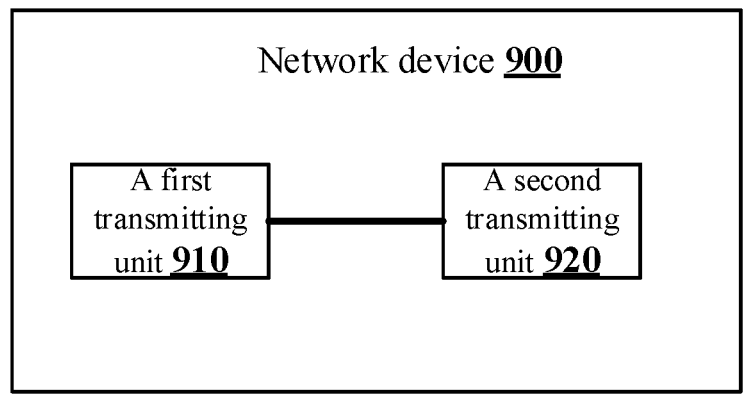
FIG. 9 illustrates a block diagram of another apparatus for sidelink information transmission according to some embodiments of the disclosure.

FIG. 9 illustrates a block diagram of another apparatus for sidelink information transmission according to some embodiments of the disclosure. As illustrated in FIG. 9, the information transmission apparatus includes a first transmitting unit 910 and a second transmitting unit 920.

For example, the first transmitting unit can be implemented by a first transceiver, and the second transmitting unit can be implemented by a second transceiver. For another example, the first transmitting unit and the second transmitting unit can be implemented by a same transceiver.

The first transmitting unit 910 may be configured to transmit first configuration information to a first UE (user equipment), the first configuration information is to configure the first UE with at least one first bandwidth part (BWP) for sidelink transmission.

The second transmitting unit 920 may be configured to transmit second configuration information to a second UE, the second configuration information is to configure the second UE with at the least one second BWP for sidelink reception.

As people of ordinary skill in the art can appreciate, the relevant description of the sidelink information transmission apparatus in the above embodiments of the disclosure may be understood in light of the relevant description of the method for sidelink information transmission according to the embodiments of the disclosure.

Figure 10:
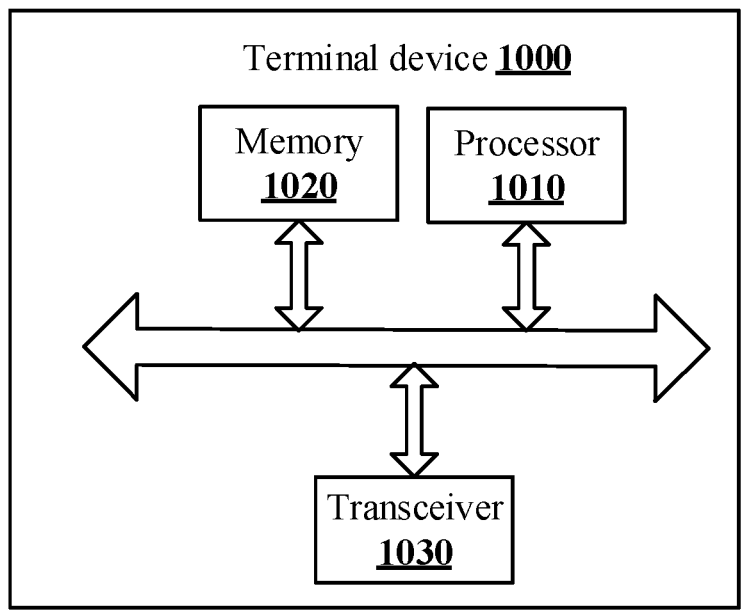
FIG. 10 illustrates a schematic block diagram of a terminal device according to some embodiments of the disclosure.

FIG. 10 illustrates a schematic block diagram of a terminal device 1000 according to some embodiments of the disclosure. As illustrated in FIG. 10, the terminal device 1000 includes a processor 1010. The processor 1010 may call a computer program from a memory to implement one of the methods described above.

Alternatively, as illustrated in FIG. 10, the terminal device 1000 may further include a memory 1020. A compute program is stored in the memory 1020. The processor 1010 may call the computer program from the memory 1020 to implement one of the methods described above.

The memory 1020 may be a device independent from the processor 1010, or may be integrated in the processor 1010.

In an example, the terminal device 1000 may further include a transceiver 1030. The processor 1010 may communicate with other device via the transceiver 1030, for example, receive information or data from other device, or send information or data to other device.

The transceiver 1030 may include a transmitter and a receiver. The transceiver 830 may further include one or more antennae.

In an example, the terminal device 1000 may be a network device and configured to implement one of the processes implemented by the network device as described above. The specific processes will not be elaborated herein for simplicity.

In an example, the terminal device 1000 may be a mobile terminal or a terminal device and configured to implement one of the processes implemented by the mobile terminal or the terminal device as described above. The specific processes will not be elaborated herein for simplicity.

Figure 11:
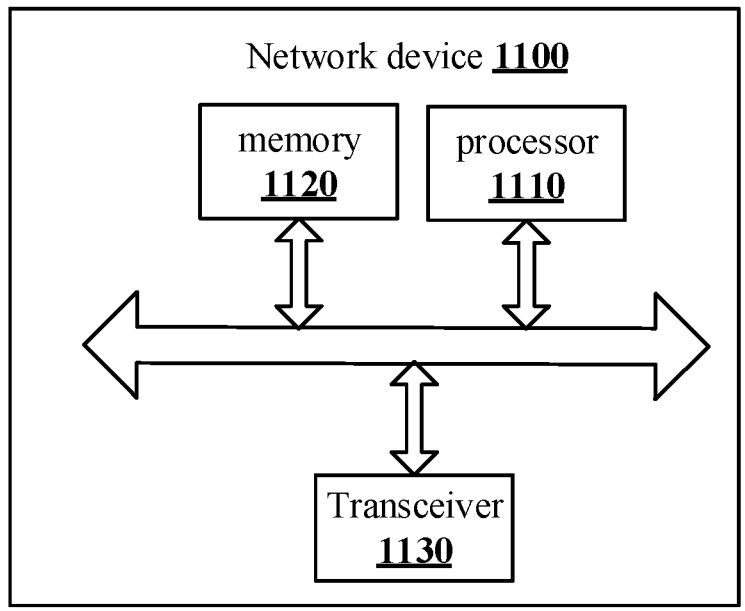
FIG. 11 illustrates a schematic block diagram of a network device according to some embodiments of the disclosure.

FIG. 11 illustrates a schematic block diagram of a network device 1100 according to some embodiments of the disclosure. The network device 1100 includes a processor 1110 and a memory 1120. A compute program is stored in the memory 1120. The computer program, when executed by the processor 1110, causes the process to implement one of the methods described above.

In an embodiment, the memory 1120 may be a device independent from the processor 1010, or may be integrated in the processor 1110.

The network device 1100 may include a transceiver 1130. The processor 1110 may communicate with another device via the transceiver 1130, for example, receive information or data from the other device, or send information or data to the other device.

The transceiver 1130 may include a transmitter and a receiver. The transceiver 1130 may further include one or more antennae.

The network device 1000 may be the network device as described above and configured to implement one of the processes implemented by the network device as described above. The specific processes will not be elaborated herein for simplicity.

Figure 12:
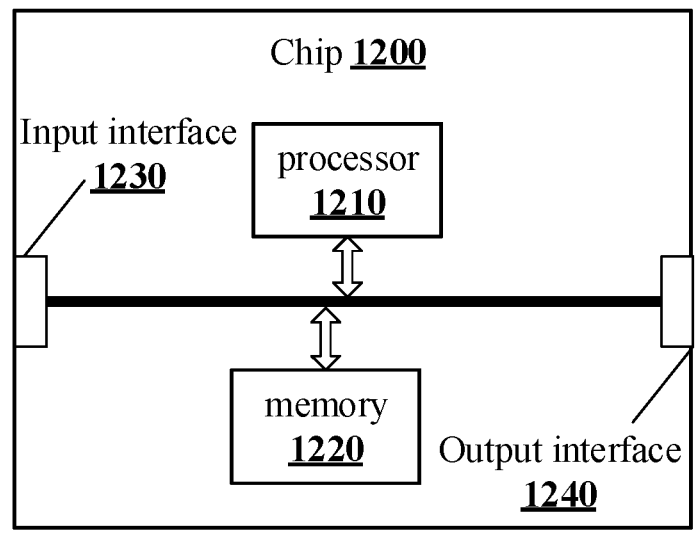
FIG. 12 illustrates a schematic block diagram of a chip according to some embodiments of the disclosure.

FIG. 12 illustrates a schematic block diagram of a chip according to some embodiments of the disclosure. The chip 1200 may include a processor 1210, which may call a computer program from a memory to implement the methods as described above.

In an embodiment, the chip 1200 may include a memory 1220. The processor 1210 may call a computer program from a memory 1220 to implement the methods as described above.

In an embodiment, the memory 1220 may be a device independent from the processor 1210, or may be integrated in the processor 1210.

In an embodiment, the chip 1200 may further include an input interface 1230. The processor 1210 may control the input interface 1230 to perform communication with other device or chip, for example, obtain information or data from other device or chip.

In an embodiment, the chip may further include an output interface 1240. The processor 1210 may control the input interface 1230 to perform communication with other device or chip, for example, output information or data to other device or chip.

In an embodiment, the chip may be applied to the network device as described above. The chip may implement the process performed by the network device as described above. The specific process will not be elaborated here for simplicity.

In an embodiment, the chip may be applied to the terminal device as described above. The chip may implement the process performed by the terminal device as described above. The specific process will not be elaborated here for simplicity.

It is to be noted that the chip mentioned here may be called a system-level chip, a system chip, a chip system or an on-chip system chip.

Figure 13:
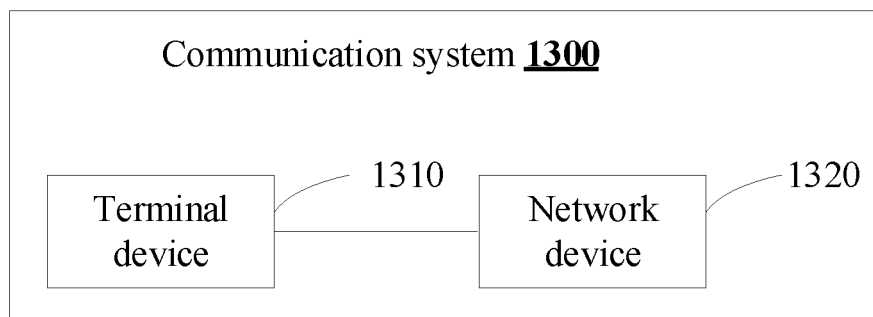
FIG. 13 illustrates a schematic block diagram of a communication system according to some embodiments of the disclosure.

FIG. 13 illustrates a schematic block diagram of a communication system 1300 according to some embodiments of the disclosure. As illustrated in FIG. 13, the communication system includes a terminal device 1310 and a network device 1320.

The terminal device 1310 may be configured to implement the functions of the terminal device as described in the above methods. The network device 1320 may be configured to implement the functions of the terminal device as described in the above methods.

In some embodiments of the disclosure, a computer readable storage medium is provided, storing a computer program.

The computer program may be applied to the network device in the embodiments of the disclosure, and which, when executed by a processor, causes the processor to execute the processes performed by the network device as described above. The specific process will not be elaborated here for simplicity.

The computer program may be applied to the mobile terminal or terminal device in the embodiments of the disclosure, and which, when executed by a processor, causes the processor to execute the processes performed by the mobile terminal or terminal device as described above. The specific process will not be elaborated here for simplicity.

In some embodiments of the disclosure, a computer program product is provided, including a computer program.

The computer program may be applied to the network device in the embodiments of the disclosure, and which, when executed by a processor, causes the processor to execute the processes performed by the network device as described above. The specific process will not be elaborated here for simplicity.

The computer program may be applied to the mobile terminal or terminal device in the embodiments of the disclosure, and which, when executed by a processor, causes the processor to execute the processes performed by the mobile terminal or terminal device as described above. The specific process will not be elaborated here for simplicity.

In some embodiments of the disclosure, a computer program is provided.

The computer program may be applied to the network device in the embodiments of the disclosure, and which, when executed by a processor, causes the processor to execute the processes performed by the network device as described above. The specific process will not be elaborated here for simplicity.

The computer program may be applied to the mobile terminal or terminal device in the embodiments of the disclosure, and which, when executed by a processor, causes the processor to execute the processes performed by the mobile terminal or terminal device as described above. The specific process will not be elaborated here for simplicity.

It should be understood that, the processor mentioned here may be an integrated circuit chip having a signal processing function. The actions described in the above methods may be performed by hardware logic circuits or software instructions in the processor. The processor may be a general purpose processor, a Digital Signal Processor (DSP), an Application Specific Integrated Circuit (ASIC), a Field Programmable Gate Array (FPGA) or the like.

As people of ordinary skill in the art may appreciate, functions of the units in the apparatus as illustrated in the embodiments of the disclosure can be understood based on the above relevant descriptions regarding the method for sidelink information transmission, and can be implemented by programs running a processor or by logical circuits. The functions of the units in the apparatus may be implemented by programs running in a processor or by specific logical circuits.

The abovementioned memory may include various media capable of storing program codes such as a U disk, a mobile hard disk, a Read-Only Memory (ROM), a Random Access Memory (RAM), a magnetic disk or an optical disk. As such, the embodiments of the disclosure are not limited to any specific combination of software and hardware.

The embodiments of the disclosure may be combined with each other freely without confliction.

In the several embodiments provided in the application, it shall be understood that the disclosed systems, devices and methods may be realized in other modes. For example, the embodiments of the above-described devices are only exemplary, for example, the division of the units is only a logic function division, other division modes may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is, the components may be positioned at one place or may be distributed on multiple network units. The objective of the solution of the embodiments may be fulfilled by selecting part of or all of the units according to actual needs.

In addition, in various embodiments of the disclosure, the functional units may be integrated in one processing unit, or the functional units may separately and physically exist, or two or more units may be integrated in one unit. The integrated units may be implemented by hardware or by hardware plus software functional units.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

What is claimed is:

1. A method for sidelink information transmission, comprising:
   receiving, by a first user equipment (UE), first configuration information from a base station, wherein the first configuration information is to configure the first UE with at least one first bandwidth part (BWP) for sidelink reception on a time division duplex (TDD) carrier comprising at least one UL BWP and at least one DL BWP; and
   receiving, by the first UE, sidelink information from a second UE on the first BWP,
   wherein:
   the at least one first BWP is associated with the at least one UL BWP and the at least one DL BWP and the at least one associated first BWP is activated or deactivated together with the associated UL BWP and DL BWP.

2. The method of claim 1, wherein the first BWP is configured with at least one of a numerology, a bandwidth, or a frequency domain position.

3. The method of claim 1, wherein the first BWP is configured on the TDD carrier, and before receiving, by the first UE, sidelink information from a second UE on the first BWP, further comprising:
   receiving, by the first UE, signaling indicating an index of the TDD carrier, or a sidelink synchronization signal or a synchronization signal/physical broadcast channel (SS/PBCH) block in DL carrier, wherein all of the first BWP, the UL BWP and the DL BWP are activated with the signaling.

4. The method of claim 1, further comprising:
   receiving, by the first UE, second configuration information from the base station, wherein the second configuration information is to configure the first UE with at least one second bandwidth part (BWP) for sidelink transmission; and
   transmitting, by the first UE, sidelink information to a third UE on the second BWP.

5. A terminal device, comprising:
   a transceiver;
   a processor; and
   a memory, storing a computer program, which, when executed by the processor, causes the terminal device to:
   receive first configuration information from a base station, wherein the first configuration information is to configure the terminal device with at least one first bandwidth part (BWP) for sidelink reception on a time division duplex (TDD) carrier comprising at least one UL BWP and at least one DL BWP; and
   receive sidelink information from a second UE on the first BWP,
   wherein:
   the at least one first BWP is associated with the at least one UL BWP and the at least one DL BWP and the at least one associated first BWP is activated or deactivated together with the associated UL BWP and DL BWP.

6. The terminal device of claim 5, wherein the first BWP is configured with at least one of a numerology, a bandwidth, or a frequency domain position.

7. The terminal device of claim 5, wherein the first BWP is configured on the TDD carrier, and the terminal device is further caused to:
   receive signaling indicating an index of the TDD carrier, or a sidelink synchronization signal or a synchronization signal/physical broadcast channel (SS/PBCH) block in DL carrier, wherein all of the first BWP, the UL BWP and the DL BWP are activated with the signaling.

8. The terminal device of claim 5, the terminal device is further caused to:
   receive second configuration information from a base station, wherein the second configuration information is to configure the terminal device with at least one second bandwidth part (BWP) for sidelink transmission; and
   transmit sidelink information to a third UE on the second BWP.

* * * * *